United States Patent [19]
Flynn

[11] Patent Number: 5,815,228
[45] Date of Patent: Sep. 29, 1998

[54] LIGHTING FOR LIQUID CRYSTAL DISPLAYS

[75] Inventor: James Marvin Flynn, Raleigh, N.C.

[73] Assignee: Ericsson Inc., Research Triangle Park, N.C.

[21] Appl. No.: 761,176

[22] Filed: Dec. 6, 1996

[51] Int. Cl.⁶ .......................... G02F 1/1335; G09G 5/00; G09G 3/36; F21V 9/16
[52] U.S. Cl. .............................. 349/71; 345/5; 345/102; 362/84
[58] Field of Search ................................. 349/71; 362/84; 345/5, 102, 82, 83

[56] References Cited

U.S. PATENT DOCUMENTS

| | | | |
|---|---|---|---|
| 3,950,078 | 4/1976 | Zatsky | 349/71 |
| 4,167,307 | 9/1979 | Cirkler et al. | 349/71 |
| 4,394,069 | 7/1983 | Kaye | 349/12 |
| 4,799,050 | 1/1989 | Prince | 349/71 |
| 4,882,617 | 11/1989 | Vriens | 349/71 |
| 5,019,808 | 5/1991 | Prince et al. | 349/104 |
| 5,146,355 | 9/1992 | Prince et al. | 349/106 |
| 5,402,143 | 3/1995 | Ge et al. | 345/102 |
| 5,408,344 | 4/1995 | Takiguchi et al. | 359/40 |
| 5,442,523 | 8/1995 | Kashima et al. | 362/31 |

OTHER PUBLICATIONS

Amperex Technical Publication, "Liquid Crystal Displays . . . Principles and Applications" pp. 1–16.
Greg Brookshire, "Embedded LCD Driver Study" Ericsson ASIC Group pp. 5&6.
Epson LCD Module for Mobile Communication Product Catalog, 1995.
Overheads from Philips Liquid Crystal presentation, Jan. 25, 1996.
Angelo Efthyvoulidis "A Design Method for Sunlight Readable Displays".

Primary Examiner—Anita Pellman Gross
Assistant Examiner—Tiep H. Nguyen
Attorney, Agent, or Firm—David C. Hall

[57] ABSTRACT

An LCD has a layer of phosphorescent material which emits light at a predetermined frequency and intensity following stimulation by either ambient light or a backlight. In a preferred embodiment, a backlight LED is driven by low duty cycle voltage pulses which periodically refresh the phosphorescence of the phosphorescent layer. The phosphorescent layer may be provided by coating the rear polarizer of the LCD with a phosphor-based emulsion or by applying a thin film of phosphorescent material to the back of the LCD. In an embodiment of the invention, a transflective LCD has a layer of phosphorescent material disposed between a rear polarizer and a transflector.

9 Claims, 7 Drawing Sheets

FIG. 3C
TRANSFLECTIVE

FIG. 3B
REFLECTIVE

FIG. 3A
TRANSMISSIVE

LIGHTING FOR LIQUID CRYSTAL DISPLAYS

BACKGROUND OF THE INVENTION

1. Field of Invention

The present invention relates generally to liquid crystal displays (LCDs) and specifically to improved lighting for LCD displays.

2. Description of Related Art

Liquid crystal displays (LCDs) are widely used in the electronic industry on products ranging from cellular telephones, calculators and watches to computers and automobiles. LCDs have many advantages over competing display technologies in areas such as size, cost, design flexibility, reliability, and power consumption. These advantages make LCDs a popular choice for designers of electronic devices.

Liquid crystal material has properties of both liquids and solids. It is characterized by the fact that the light transmission characteristics of a thin layer of liquid crystal may be altered by applying an electric field to the material. This property is exploited in a liquid crystal display.

LCDs consist of a thin layer of liquid crystal encased between a pair of thin glass plates. The inner surfaces of the glass plates are provided with transparent electrodes which define the patterns, characters or images to be displayed. The outer surfaces of the glass plates are provided with polarizing lenses. When a voltage is applied across a pair of corresponding electrodes, the display switches from opaque to clear at the location where the electrodes overlap, or vice versa, depending on the orientation of the polarizing lenses. The electrodes may be shaped and arranged into characters, segments, shapes or images, depending on the purpose and function of the display.

In a reflective LCD, the display is illuminated solely by ambient light. The LCD is backed by a reflective material which reflects ambient light back through the display. Reflective LCDs are ideally suited for low power applications in battery powered devices, as no power is needed to light the display. However, since reflective LCDs rely solely on ambient light for illumination, their brightness is limited. The brightness of a reflective LCD can be no greater than about 50%, where "brightness" is defined as the ratio of the luminance of the reflected light to the luminance of the transmitted light. Thus, reflective LCDs typically appear gray and are difficult to read in low light conditions.

The brightness of an LCD may be improved by backlighting the display. This is typically done by providing a light source such as a light emitting diode (LED) behind the LCD. In this "transmissive" mode of operation, light from the LED passes through the LCD where it is blocked or passed depending on the configuration and state of the various electrodes. However, LED backlighting consumes a relatively large amount of power, since the LED must continuously illuminate the display whenever the device is powered on.

One solution to this problem is to provide a partly transmissive reflector on the back of the LCD that both reflects ambient light and transmits diffused backlight from an LED. This mode of operation, known as "transflective," permits the LCD to be operated in reflective mode when there is sufficient ambient light to read the display or at other times when increased brightness is not necessary. In reflective mode the LED remains switched off and power is conserved. When increased brightness is desired, the LED may be powered on in order to backlight the display. Thus, transflective mode is a hybrid of the transmissive and reflective modes.

LCDs used in cellular telephones are typically transflective, since most cellular telephones are battery operated, but must be capable of operation at night or in otherwise low light conditions. The telephone display typically stays in reflective mode until a key on the telephone is pressed by the user, at which time the LCD switches to transmissive mode and an LED backlight is switched on. The backlight LED remains on until a predetermined period of time has passed without any keypad activity. This mode of operation has the benefit of providing increased brightness when needed but conserving energy when increased brightness is not needed.

Despite its benefits, a transflective LCD may still consume an undesirably large amount of power. This is especially problematic in the cellular telephone industry, due to the ever-increasing demands being placed on cellular telephone batteries. Designers of cellular telephones are constantly looking for ways to lower the telephones' standby current consumption in order to extend battery life. Thus, there continues to be a need in the art for an LCD having improved backlighting and power consumption characteristics.

SUMMARY OF THE INVENTION

In accordance with the present invention, an LCD is provided with a layer of phosphorescent material which emits light at a predetermined frequency and intensity following stimulation by ambient light or by a backlight. In a preferred embodiment, a backlight LED is driven by low frequency, low duty cycle voltage pulses which periodically refresh the phosphorescence of the phosphorescent layer. The phosphorescent layer may be provided by coating the rear polarizer of the LCD with a phosphor-based emulsion or by applying a thin film of phosphorescent material to the back of the LCD. The color of the LCD may be varied by using phosphorescent emulsions having varying suspension liquid compositions. In an embodiment of the invention, a reflective LCD has a layer of phosphorescent material disposed between a rear polarizer and a reflector.

Accordingly, it is an object of the present invention to provide a liquid crystal display having improved backlighting. It is a further object of this invention to provide an LCD having reduced power requirements.

A still further object of the invention is to provide a method of manufacturing an LCD having improved backlighting characteristics.

These and other objects of the invention, together with features and advantages thereof will become apparent from the following detailed specification when read with the accompanying drawings in which like reference numerals refer to like elements.

DETAILED DESCRIPTION OF THE PREFERRED EMBODIMENTS

The present invention will now be described with reference to the accompanying drawings, in which a preferred embodiment of the invention is shown. This invention should not be construed as being limited to the specific embodiment shown, however, as it may be embodied in many different forms. Rather, the preferred embodiment is provided so that this disclosure is thorough and complete, and will fully convey the scope of the invention to those skilled in the art.

Figure 1:
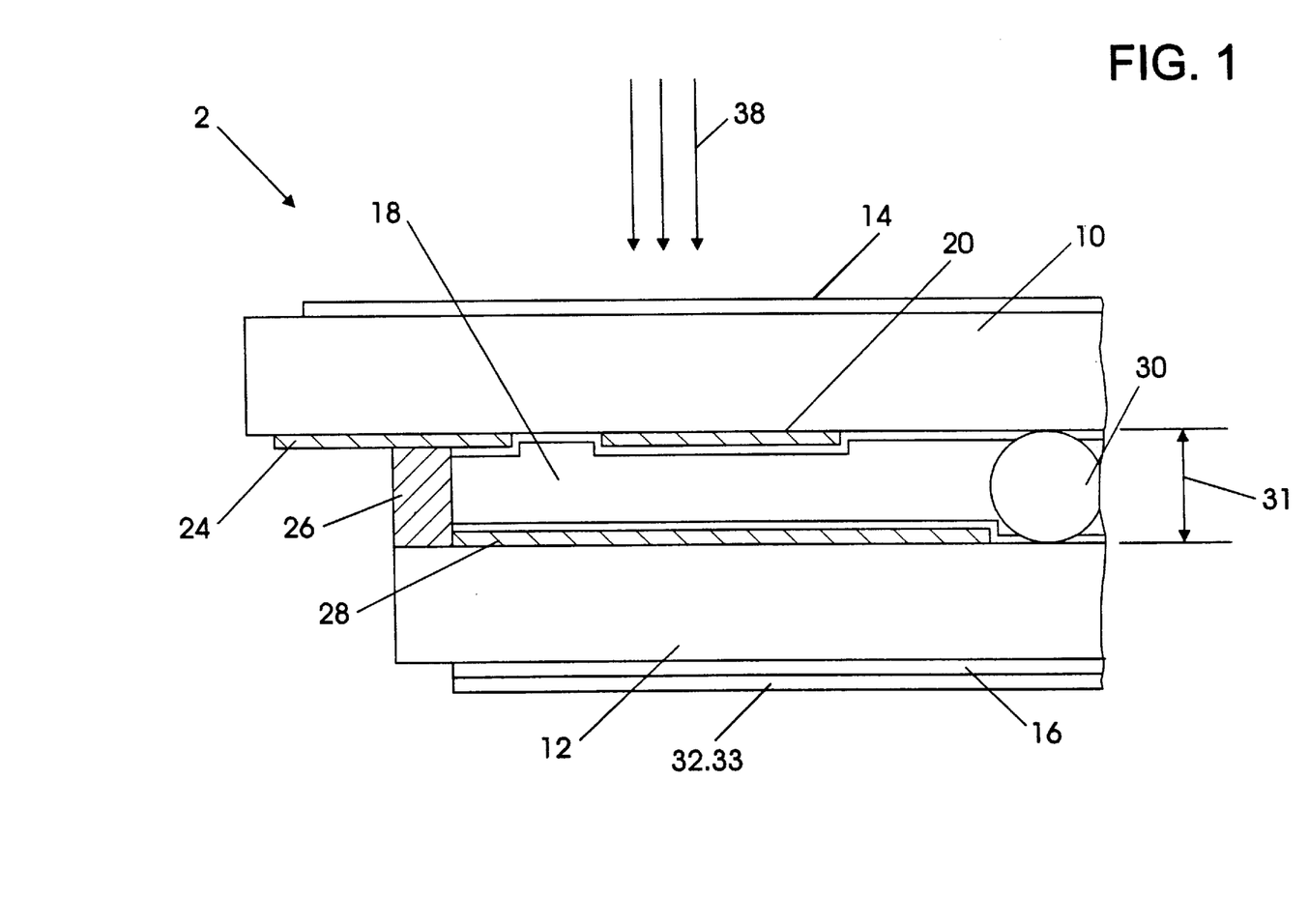
FIGS. 1, 1a are a partial cross section of a representative prior art transflective LCD.

A typical arrangement for a liquid crystal display (LCD) is shown in FIG. 1. A liquid crystal display 2 has a front polarizer 14 affixed to a front light transmissive panel 10 in a first plane. Front polarizer 14 polarizes plane incident light in an arbitrary first polarizing direction 17 (see FIG. 1A).

The operation of polarizers, or polarizing filters, is well known to those skilled in the art. A polarizer passes only those lightwaves whose associated electromagnetic fields are oriented in a predetermined "polarizing direction." The polarizing direction lies in a plane parallel to the surface of the polarizer.

The light transmissive panel 10 may be a glass or plastic panel. For simplicity, the light transmissive panel 10 will be referred to herein as a "glass" 10, but it should be recognized that any suitable light transmissive material is encompassed within the scope of the term "glass" as used herein.

Transparent segment electrodes 20 are mounted on the underside of front glass 10 and are connected via connecting paths 24 to external control circuitry (not shown). Rear glass 12 is disposed in a parallel plane beneath front glass 10. One or more transparent back plane electrodes 28 are affixed to the upper surface of rear glass 12. Rear glass 12 is separated from front glass 10 by a predetermined separation distance 31 which is maintained by a plurality of spacers 30.

A layer of liquid crystal material 18, which typically comprises twisted nematic liquid crystal molecules, is disposed between front glass 10 and rear glass 12. Perimeter seal 26 extends around the perimeter (not shown) of the LCD 2 and prevents the liquid crystal material 18 from leaking out of the LCD 2.

A rear polarizer 16 is affixed to the underside of the rear glass 12. Rear polarizer 16 polarizes incident light in a second polarizing direction 19 (see FIG. 1A) which may or may not be the same direction as the first polarizing direction, depending on whether a negative or a positive image is desired.

In a reflective LCD, rear polarizer 16 is backed with a layer of reflective material 32 such as brushed aluminum, which reflects ambient light back through the display 2. In a transflective LCD, rear polarizer 16 is backed with a partly transmissive reflector 33 (i.e. a "transflector") that reflects ambient light back into the display 2 and passes light from a backlight source (not shown) into the display 2.

The operation of liquid crystal displays is well known in the art. However, a description of LCD operation is provided here to aid the reader in understanding the present invention.

Referring still to FIG. 1, the operation of a typical positive image reflective LCD is as follows. The surface of a positive image LCD 2 appears light except at locations where a voltage is applied to a corresponding electrode pair 40. Ambient light entering the LCD 2 is polarized by front polarizer 14 in a first polarizing direction 17 (see FIG. 1A) and passes through front glass 10 and transparent segment electrodes 20 into liquid crystal layer 18. The front polarizer 14 passes only those light waves oriented in the first polarizing direction 17 and blocks all other light waves.

Segment electrode 20 and back-plane electrode 28 comprise an electrode pair 40 over the surface area where they overlap. If no voltage is applied across the electrode pair 40, the liquid crystal material 18 between the segment electrode 20 and the back plane electrode 28 acts to repolarize the light in a second polarizing direction 19 (see FIG. 1A). That is, the liquid crystal changes the polarization of light from the first polarizing direction 17 to the second polarizing direction 19. This repolarization is caused by the internal alignment of liquid crystal molecules, which is controlled by a pair of orientation layers 22 deposited on the inner surfaces of front glass 10 and rear glass 12. The light then passes through rear glass 12 to rear polarizer 16, which polarizes light in the second polarizing direction 19. Since the light has been repolarized by the liquid crystal material to the second polarizing direction 19, the light is not blocked by the rear polarizer 16, but passes through rear polarizer 16 and is reflected off of reflective backing 32 back into rear polarizer 16 and through rear glass 12. The light is then repolarized by the liquid crystal layer 18 to the first polarizing direction 17, and passes through the front glass 10 and the front polarizer 14.

Referring still to FIG. 1, if a sufficient voltage is applied across the electrode pair 40, the molecular structure of the liquid crystal material 18 is altered such that the liquid crystal layer 18 no longer repolarizes the light. Light passing through the liquid crystal layer 18 remains polarized in the first polarizing direction 17, and is subsequently absorbed by the rear polarizer 16, causing the surface of the display 2 to appear dark at that location.

Figure 1A:
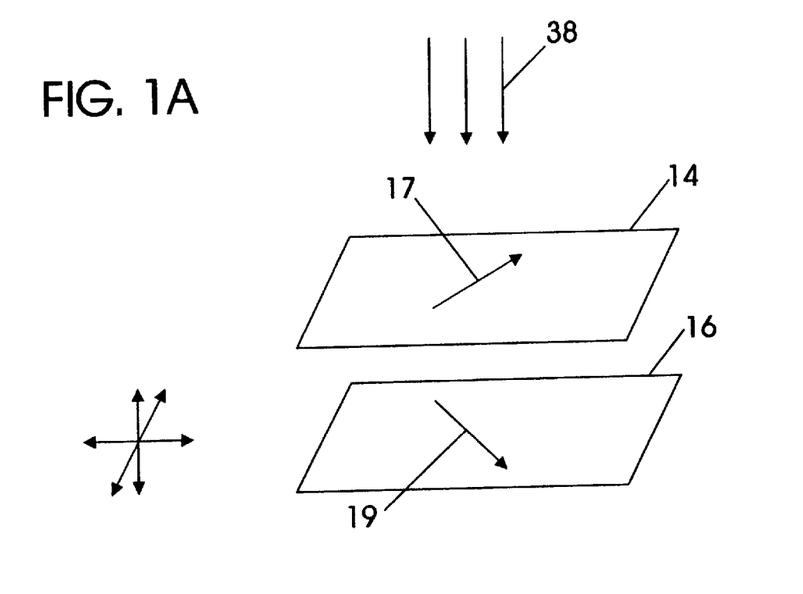

FIG. 1A illustrates the orientation of the first polarizing direction 17 and the second polarizing direction 19 in a positive image LCD. Front polarizer 14 polarizes light in a first polarizing direction 17. Rear polarizer 16, which is located beneath and parallel to front polarizer 14 polarizes light in a second polarizing direction 19. Ambient light 38 strikes the front polarizer 14 and is polarized in the first polarizing direction 17. As described above, the liquid crystal material repolarizes the incident light to the second polarizing direction, which permits it to pass through the rear polarizer 16.

Figure 2A:
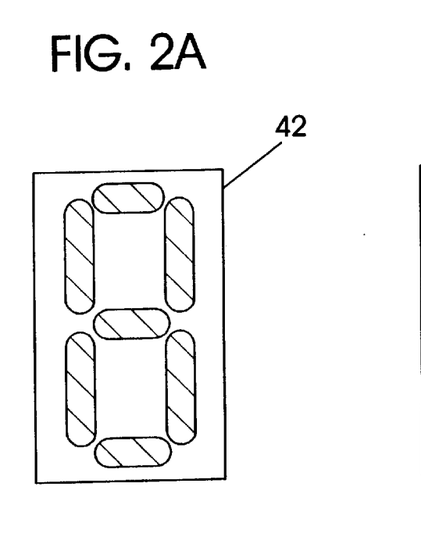
FIG. 2 illustrates two display modes of an LCD.
Figure 2B:
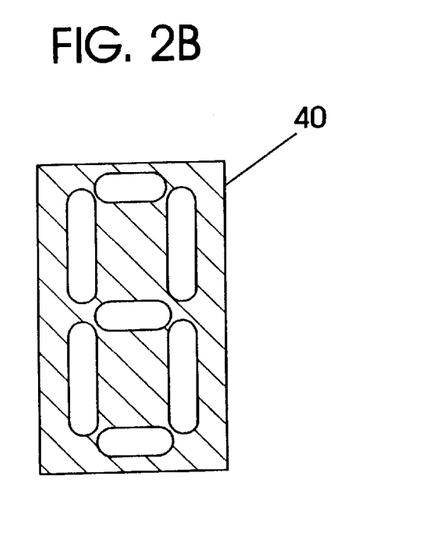

Thus, a positive image reflective LCD normally reflects incident light (and consequently appears light), except at locations at which a voltage is applied between an overlapping electrode pair 40. If the front polarizer 14 and rear polarizer 16 are oriented such that each polarizes light in the same direction, then the LCD will normally not reflect light except at locations at which a voltage is applied, thus forming a negative image display. An example of a positive image LCD is shown on FIG. 2a. An example of a negative image LCD is shown in FIG. 2b.

Figure 3A:
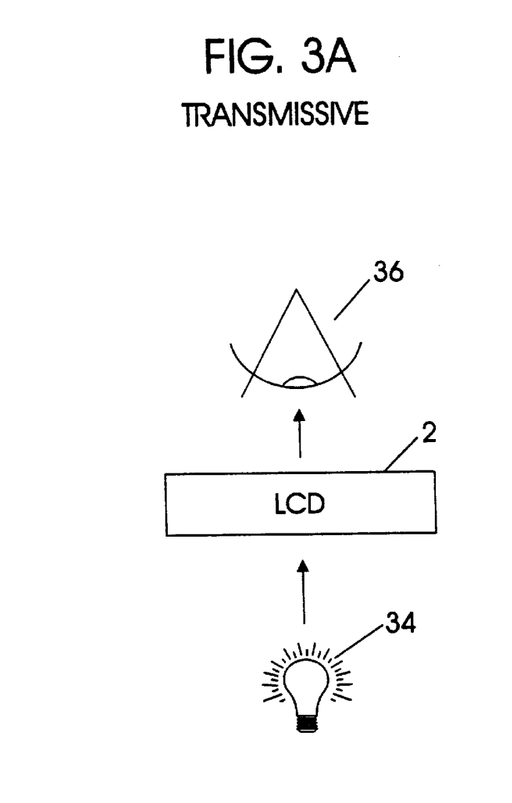
FIGS. 3a–c illustrate selected modes of operation of LCDs.
Figure 3B:
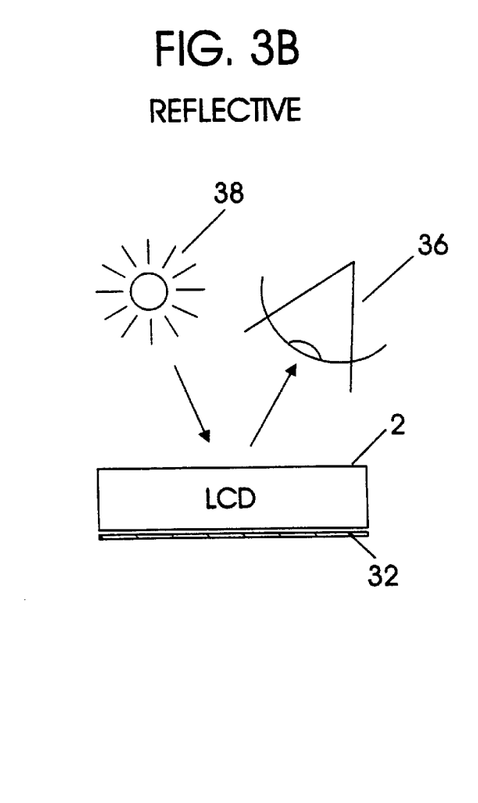
Figure 3C:
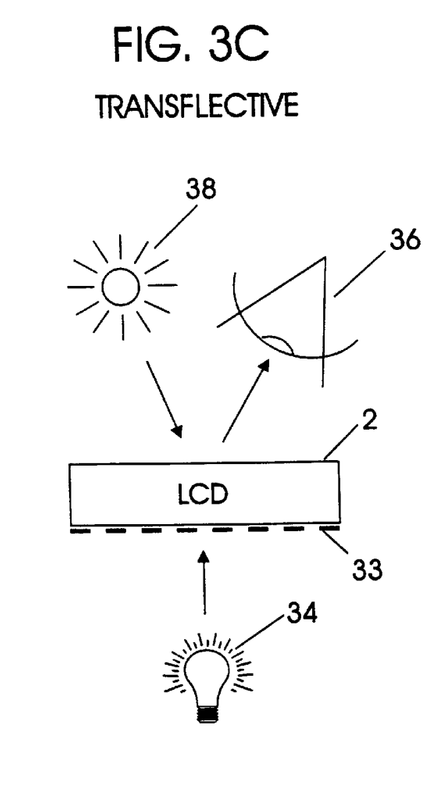

FIG. 3 shows the various types of LCD lighting configurations. FIG. 3a shows a transmissive LCD 2a. Light from the backlight source 34 passes through LCD 2a and illuminates the display 2a for the viewer 36. FIG. 3b shows a reflective LCD 2b, in which ambient light passes into the LCD 2b and is reflected off of reflective layer 32 back through the LCD 2b. FIG. 3c shows a transflective LCD 2c.

In a transflective LCD, ambient light passes into the LCD 2c and is reflected off of transflective layer 33 back through the LCD 2c to the viewer 36. In addition, light from backlight source 34 passes through transflective layer 33 into LCD 2c. A transflective LCD is implemented by providing a partially transmissive reflector on the back of rear polarizer 16, instead of a purely reflective material.

Figure 4A:
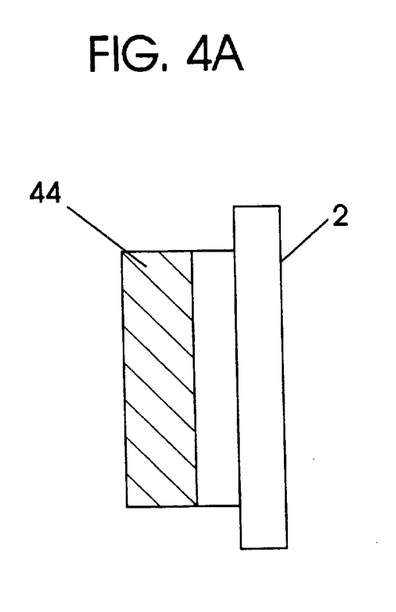
FIGS. 4a–c show various methods of backlighting an LCD.
Figure 4B:
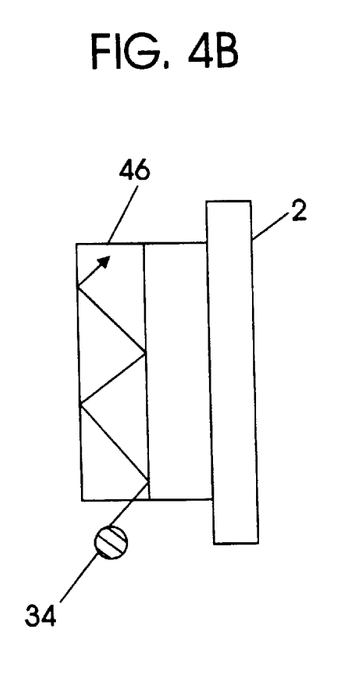
Figure 4C:
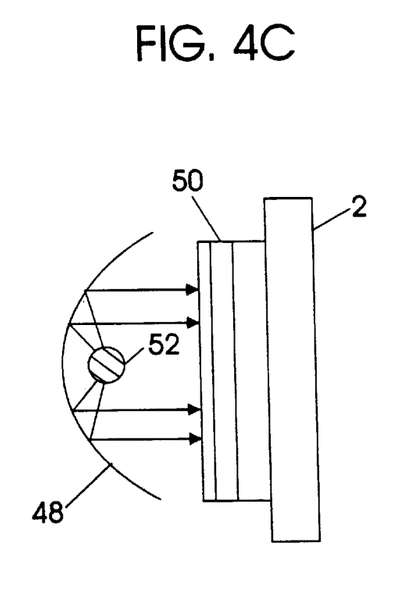

Backlighting of LCDs is shown in FIG. 4. A backlight is placed behind the LCD 2 for additional illumination of the LCD. Backlighting may be provided by either a plane light source 44 as shown in FIG. 4(a), a light guide 46 as shown in FIG. 4(b) or a combination point source 52 and reflector 48 as shown in FIG. 4(c). A diffuser plane 50 is used in the configuration shown in FIG. 4(c) to diffuse light from the point source 52.

Figure 5:
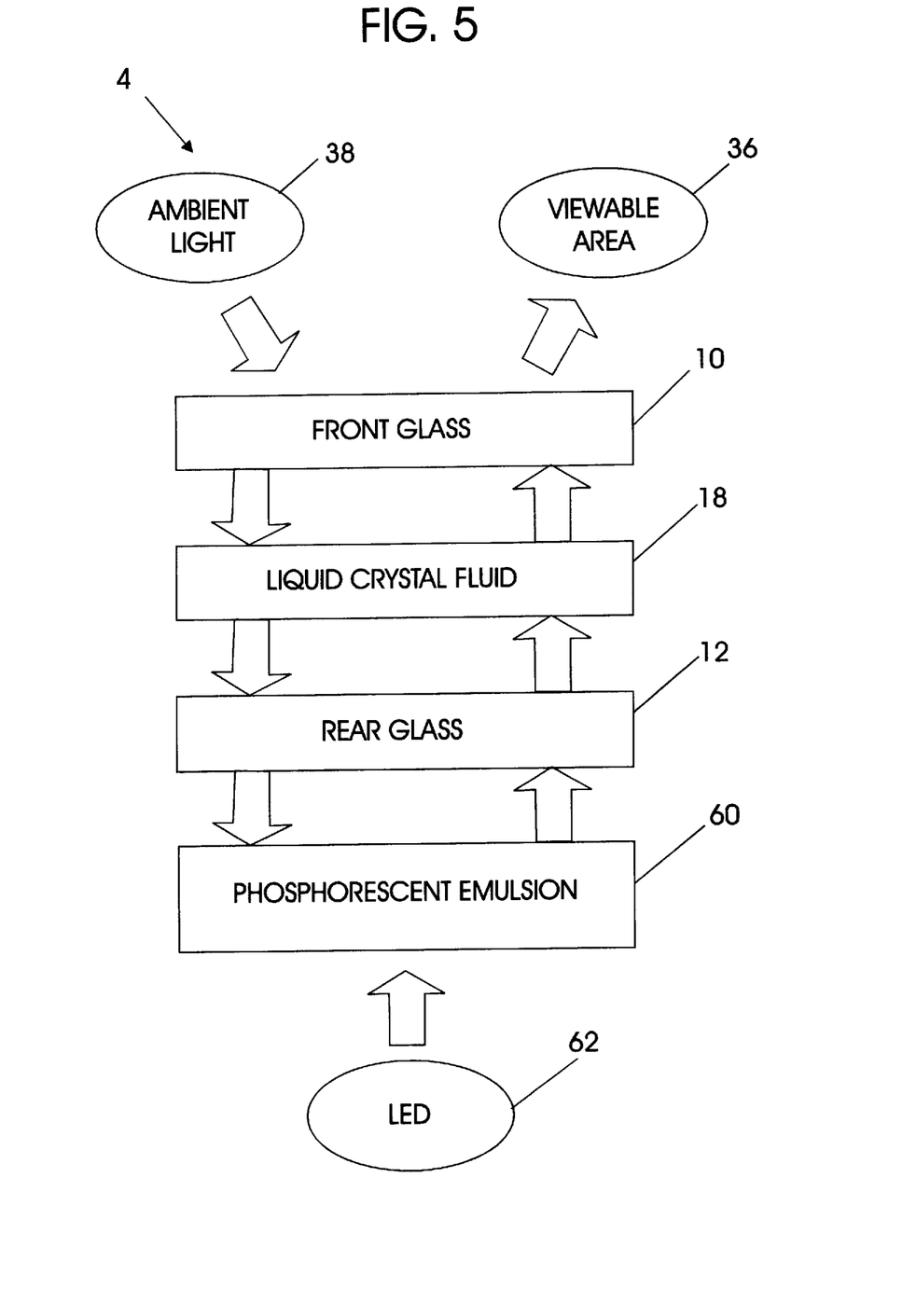
FIG. 5 is a block diagram of an embodiment of the present invention.

FIG. 5 is a schematic diagram of the present invention. As shown in FIG. 5, an LCD has a front glass 10, a layer of liquid crystal material 18, a rear glass 12, and a light source 62. Ambient light 38 is incident on the front glass 10. A layer of phosphorescent material 60 is provided between the rear glass 12 and the light source 62. Light from the light source 62 passes through the phosphorescent material 60. The phosphorescent material 60 is excited by both the ambient light 38 and light from the light source 62. Once stimulated, the phosphorescent material 60 continues to emit light at a predetermined intensity and frequency for a predetermined period after the light source 62 is switched off.

In a preferred embodiment, the light source 62 is an LED that is driven by low duty cycle voltage pulses from a voltage source. A pulse having a duty cycle of less than 50% is considered to be a low duty cycle pulse. In such an embodiment, the LED is not continuously energized. Thus, the amount of power consumed by the LED is reduced.

Moreover, the brightness (and correspondingly the power consumption) of the display may be controlled by manipulating the on/off frequency of the LED. This frequency could be controlled by means of a user-selectable option in the device in which the display is used. The current consumption of the LED could be reduced by simply providing a series resistance in the LED circuit. However, with such an approach it would not be possible to interactively adjust the backlight brightness and backlight power consumption to the user's preference.

In one embodiment, the phosphorescent layer comprises a layer of phosphorescent emulsion or phosphor-based paint. The intensity and duration of light emitted by the phosphorescent material is a function of the amount of phosphor present in the material.

In a preferred embodiment, an LCD 2 of the present invention is implemented as a positive image LCD. A positive image LCD is preferred as it maximizes the amount of light passing through the phosphorescent material 60 to achieve as much phosphor excitation as possible. A negative image display would block most of the ambient light from reaching the phosphorescent layer 60.

The phosphorescent layer 60 shown in FIG. 4 also acts to diffuse light from the light source 62, thus eliminating the need to provide a separate diffusing plane in the device.

Figure 6:
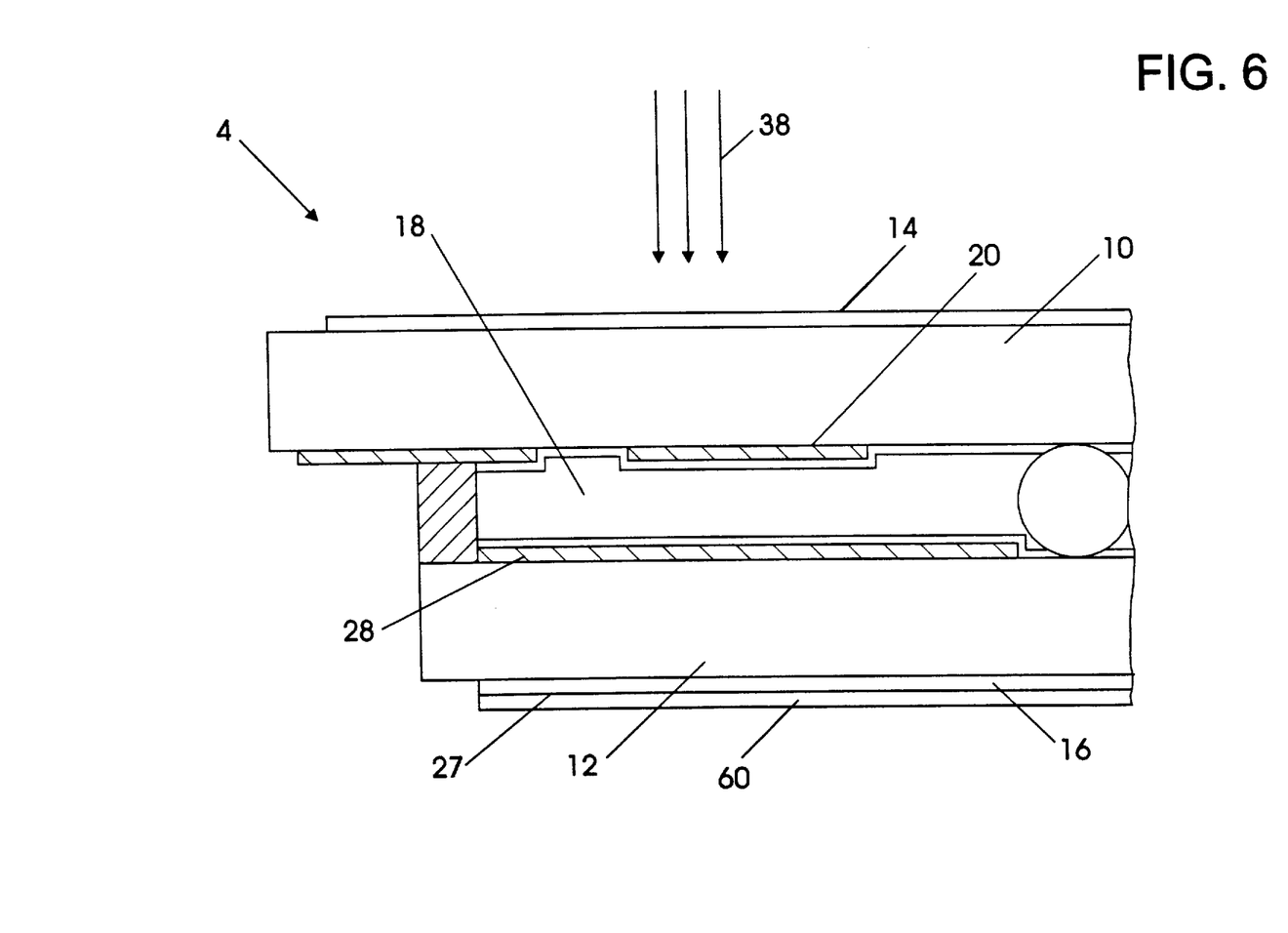
FIG. 6 is a partial cross section of an embodiment of the present invention.

A preferred embodiment of the invention is shown in FIG. 6. The LCD 4 has a front polarizer 14, a front glass 10, a layer of liquid crystal material 18, a rear glass 12 and a rear polarizer 16. A phosphorescent layer 60 is provided on the rear surface 27 of rear polarizer 16. A light source (not shown) is provided behind phosphorescent layer 60.

Figure 7:
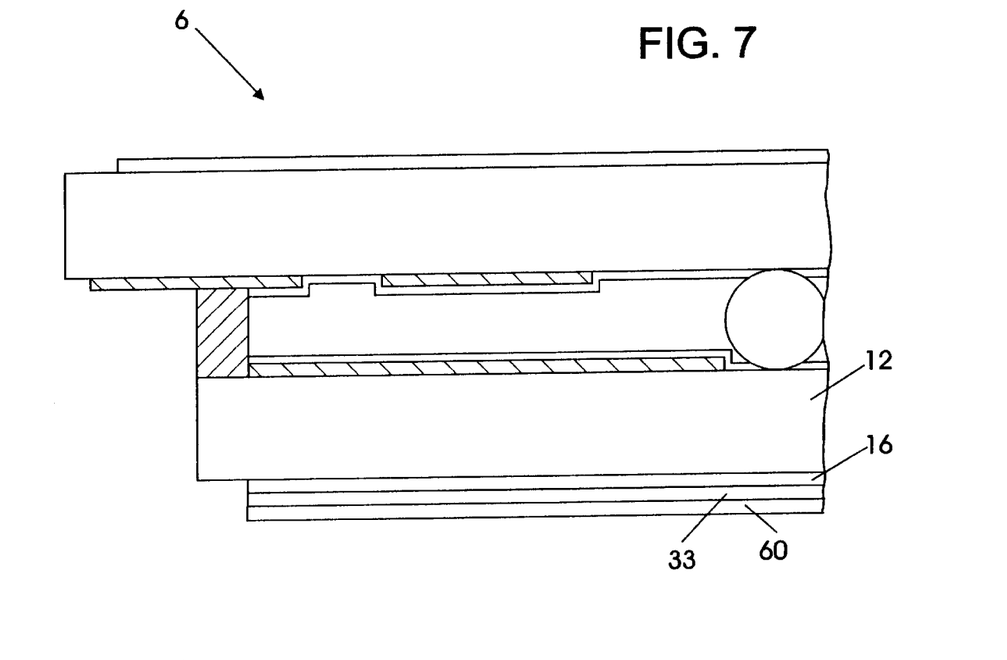
FIG. 7 is a partial cross section of another embodiment of the present invention.

A second embodiment of the invention is shown in FIG. 7. FIG. 7 is a partial cross section of an LCD 6 having rear glass 12 and rear polarizer 16. In this embodiment, a transmissive reflector 33 is provided between rear polarizer 16 and the phosphorescent layer 60. Light from the light source (not shown) passes through phosphorescent layer 60, exciting the phosphor atoms in the phosphorescent layer 60. The light passes through the phosphorescent layer 60 and the transflector 32, and into rear polarizer 16 and rear glass 12. In this embodiment, the phosphorescent layer 60 is not excited by ambient light, since ambient light is reflected prior to reaching the phosphorescent layer 60.

Figure 8:
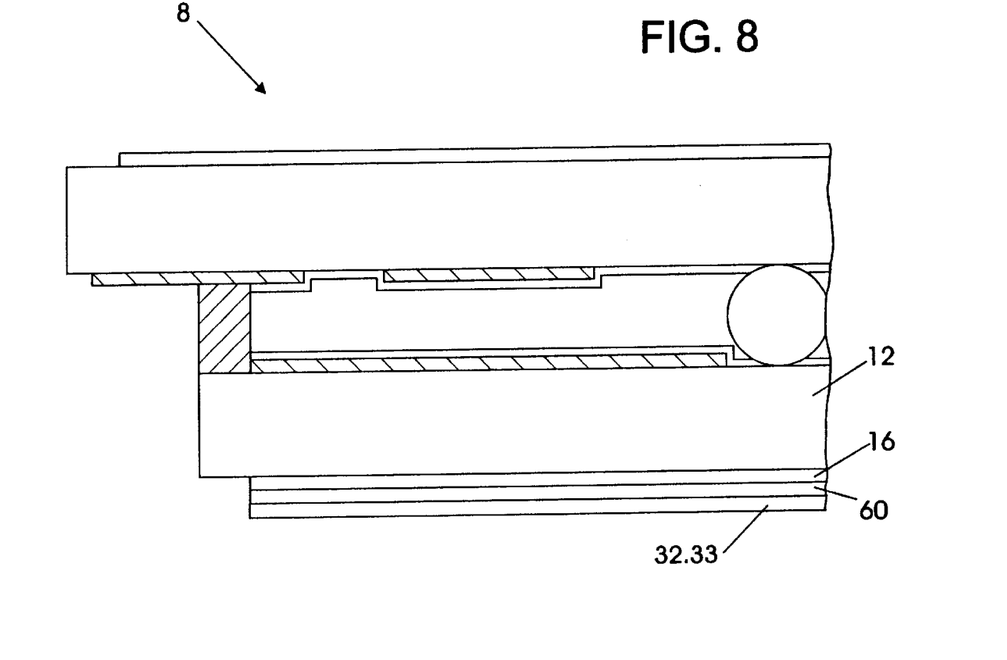
FIG. 8 is a partial cross section of another embodiment of the present invention.

Another embodiment of the invention is shown in FIG. 8. In that embodiment, an LCD 8 has a reflective layer 32 or a transmissive reflector 33 provided behind phosphorescent layer 60. If a backlight source (not shown) is used, transflector 33 is employed. Otherwise, reflector 32 is used. The phosphorescent layer 60 is stimulated by ambient light and light from the backlight source (not shown).

If the LCD 8 is provided with a backlight source, light from the backlight source (not shown) passes through transflector 33 and into phosphorescent layer 60. The light passes into rear polarizer 16 and rear glass 12.

If the LCD 8 is not provided with a backlight source (i.e. if the LCD is reflective), ambient light passes from rear glass 12 through rear polarizer 16 and phosphorescent layer 60. The light passing through the phosphorescent layer 60 is then reflected by reflector 32 back into phosphorescent layer 60.

While the present invention has been described with respect to its preferred embodiment, those skilled in the art will recognize that the present invention is not limited to the specific embodiment described and illustrated herein. Different embodiments and adaptations besides those shown herein and described as well as many variations, modifications and equivalent arrangements will now be apparent or will be reasonably suggested by the foregoing specification and drawings, without departing from the substance or scope of the invention. While the present invention has been described herein in detail in relation to its preferred embodiment, it is also understood that this disclosure is only illustrative and exemplary of the present invention and is made merely for purpose of providing a full and enabling disclosure of the invention. Accordingly, it is intended that the invention be limited only by the spirit and scope of the claims appended hereto.

What is claimed is:

1. An LCD device comprising:
   a front light transmissive panel and a rear light transmissive panel disposed parallel to the front light transmissive panel, the front and rear light transmissive panels defining therebetween an interior space;
   a layer of phosphorescent material disposed adjacent to the rear light transmissive panel and outside the interior space defined by the front and rear light transmissive panels; and
   a light source for illuminating the LCD display, said light source located adjacent to said phosphorescent layer and comprising a light emitting diode;
   wherein said light emitting diode is powered by a voltage pulse train.

2. An LCD device according to claim 1, wherein said voltage pulse train has a low duty cycle.

3. An LCD device according to claim 2, wherein said phosphorescent material comprises phosphor-based paint.

4. An LCD device, comprising:
   a front polarizer for polarizing light in a first direction, said front polarizer defining a front and a rear area;

a front light transmissive panel disposed behind said front polarizer;

a rear light transmissive panel disposed behind said front light transmissive panel;

a layer of liquid crystal material disposed between said front light transmissive panel and said rear light transmissive panel;

a rear polarizer disposed behind said rear light transmissive panel;

a layer of phosphorescent material disposed behind said rear polarizer; and a light source for illuminating the LCD device, said light source located adjacent to said phosphorescent layer and comprises a light emitting diode, said light emitting diode is powered by a voltage pulse train from a voltage source.

5. An LCD device according to claim 4, wherein said voltage pulse train has a low duty cycle.

6. An LCD device according to claim 4, wherein said phosphorescent material comprises a coating of phosphor-based paint applied to said rear polarizer.

7. An LCD device according to claim 4, further comprising a transflector disposed behind said layer of phosphorescent material.

8. An LCD device according to claim 4, wherein said LCD device is configured to produce a positive image display.

9. An LCD device, comprising:

a front polarizer for polarizing light in a first direction, said front polarizer defining a front area and a rear area;

a front light transmissive panel disposed behind said front polarizer a rear light transmissive panel disposed behind said front light transmissive panel;

a layer of liquid crystal material disposed between said front and rear light transmissive panels;

a rear polarizer disposed behind said rear light transmissive panel;

a layer of phosphorescent material disposed behind said rear polarizer;

a transflector disposed behind said layer of phosphorescent material; and a light emitting diode disposed behind said transflector for illuminating said device, wherein said light emitting diode is powered by a voltage pulse train having a low frequency and a low duty cycle;

wherein said LCD device is configured to produce a positive display image.

* * * * *